Figure 1:
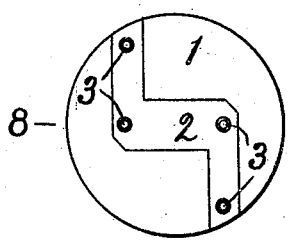

W. W. YOUNG.
ACOUSTIC DIAPHRAGM.
APPLICATION FILED SEPT. 22, 1914.

1,153,837.

Patented Sept. 14, 1915.

WITNESSES:
A. C. Fairbanks
H. I. Cutter

INVENTOR.
William W. Young,
BY
Webster & Co.
ATTORNEYS.

UNITED STATES PATENT OFFICE.

WILLIAM W. YOUNG, OF AGAWAM, MASSACHUSETTS, ASSIGNOR TO FRANK H. YOUNG, OF ST. LOUIS, MISSOURI.

ACOUSTIC DIAPHRAGM.

1,153,837. Specification of Letters Patent. Patented Sept. 14, 1915.

Application filed September 22, 1914. Serial No. 862,914.

*To all whom it may concern:*

Be it known that I, WILLIAM W. YOUNG, a citizen of the United States of America, residing at Agawam, in the county of Hampden and State of Massachusetts, have invented a new and useful Acoustic Diaphragm, of which the following is a specification.

My invention relates to improvements in diaphragms for use in telephones, talking-machines, and the like, to reproduce sound, and consists essentially of a thin metallic or fiber base or body piece, to which is closely, intimately and securely attached a stay or brace which extends from the center of such body piece in one or more directions, all as hereinafter set forth.

I have found that an acoustic diaphragm should, in order to give the best results, be made of very thin material, but inasmuch as a diaphragm, if made of too thin material, is unable to endure the strain to which a diaphragm must necessarily be subjected, means must be provided for reinforcing, stiffening and strengthening the same, without impairing its acoustic qualities or rendering it appreciably less sensitive than would be the case if the device were not provided with said means. As just intimated, however, a diaphragm as sensitive as desired would be impracticable without the addition of the aforesaid reinforcing, stiffening and strengthening means or brace, the body part being too thin to endure for any length of time what may be termed the piston action to which said body is subjected when in use. A centrally disposed member having an extended part or parts, which member with its parts is properly secured to the main portion or body of the diaphragm, is quite capable of affording the necessary amount of reinforcement to said body, however thin the latter may be, so that a most serviceable diaphragm is produced. The reinforcing member or brace may be made in various shapes or forms, so long as there is a part to augment the central portion of the body and one or more parts to support directly and indirectly the other portions of said body. Thus constructed the diaphragm is sensitive to the least vibration, yet rigid enough to carry any volume of sound or combination of sounds, either vocal or instrumental, without blasting, rattling, or flatting out.

The piston action, to which reference has been made, covers or includes practically the entire area of a diaphragm constructed in accordance with my invention, the brace never being heavy or thick enough to prevent or interfere with such action, but on the contrary augmenting or enhancing it, wherefore the vibrations imparted to the diaphragm produce sound waves that bring out fuller, clearer, rounder and more natural reproductions than is possible with single-piece plain or crimped diaphragms. With either of the latter the vibrations have only a limited range from the center, and blasts on high vocal and instrumental notes are inevitable.

The primary object of my invention is to produce, in accordance with the foregoing, a sound-reproducing device or diaphragm which gives out sound that more nearly simulates the original sound than has been possible heretofore, and this with increased rather than diminished volume.

Other objects will appear in the course of the following description.

I attain the objects and secure the advantages of my invention by the means illustrated in the accompanying drawings, in which—

Figure 8:
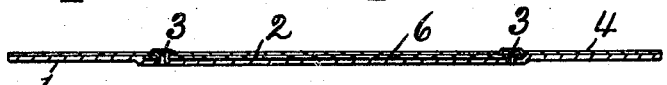
Figure 9:
Figure 10:
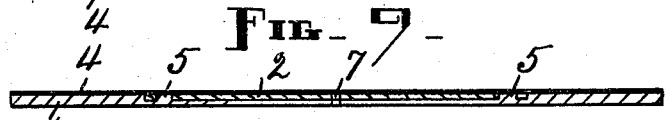

Figures 1 to 7, inclusive, are plans of various diaphragms which embody practical forms of the invention; Fig. 8, an enlarged cross-section taken on lines 8—8, in Fig. 7; Fig. 9, a similar cross-section but showing a slight modification in construction, and, Fig. 10, a cross-section on lines 10—10, Fig. 3.

Similar reference numerals designate similar parts throughout the several views.

I have not illustrated all of the shapes or forms of braces that are available, but have shown a sufficient number fully to disclose my invention.

In the drawings a base or body in the form of a disk appears at 1. This disk may be made of either very thin metal or of very thin fibrous material or fabric, an example of the latter appearing in Figs. 3 and 10. Mounted on or attached to each disk 1 is a brace 2. The brace 2 in every case has a part at the center of its disk 1, and one or more parts extending from said first-mentioned part. In some examples what may be termed the arms or branches of the brace 2 extend quite to the periphery of the underlying disk 1, as in Figs. 1 and 3, while in other examples such arms or branches do not extend so far but fall short of such periphery, as in the other views, it being immaterial so far as my invention is concerned whether or not the brace extends clear to the disk periphery. The braces 2 are made of any thin material which is suitable for the purpose, sheet-metal being a good material and entirely practical. The brace 2 is preferably countersunk in the disk 1, whether the latter be of metal or of fiber or fabric, as clearly shown in Figs. 8 and 10, although it is possible to attach said brace on the surface of a plain disk which has no countersink therein, as is represented in Fig. 9.

Various means may be employed for securing the brace in place to the disk and I will next describe what I have thus far discovered to be among the best means for that purpose. The disk 1 when of metal may have holes punched therein and the metal around the edges of such holes on one side upset, after passing through openings provided therefor in the superimposed brace 2, onto the contiguous or exposed side of said brace, as shown at 3 in Figs. 1, 8 and 9. By this means the brace is securely fastened to the disk. Similar means, but centrally located, are employed in the Fig. 4 diaphragm. It is necessary to cover the holes left in the diaphragm by the aforesaid punching and upsetting operations, and to this end an integument 4, of paper or other suitable thin material, is attached through the medium of suitable adhesive material to the disk, either over the brace, as in Fig. 8, or on the opposite side, as in Fig. 9. This integument, where glued or cemented over and to the brace as well as the disk, serves as an additional fastening or securing means, and will be the only such means when the disk is of fiber or fabric, as represented in the last view.

Figure 2:
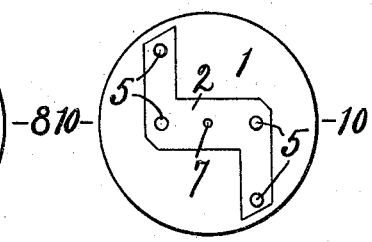
Figure 3:
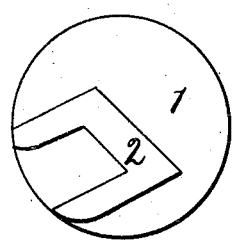
Figure 4:
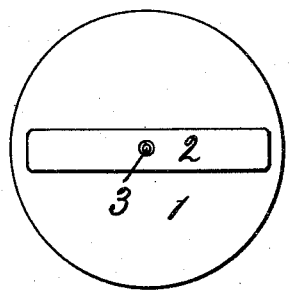
Figure 5:
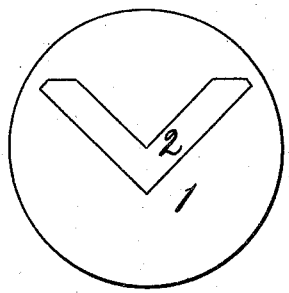

In Figs. 2 and 3 the fibrous material of the disk 1 is represented at 5 as being forced into the holes provided in the brace 2 for the rivet elements punched from the disk when the latter consists of metal. The integument 4 may be placed over the brace 2 in all cases, since all of the elements are so comparatively thin. This integument may be employed exclusively in all cases or without the rivet elements in the metal disks. The integument or an equivalent covering or coating is most always used as a securing or fastening means for the base, regardless of the nature of other fastening or securing means or whether or not any other such means be present, and even when an integument is applied to the under side of the disk 1, or the side opposite that to which the brace 2 is affixed, as in Fig. 9, another integument will usually be applied to the other side also, over the brace. In order to preclude any possibility of independent movement as between the disk, especially when the same is of metal, and its brace, and consequent rattle, a fabric insert 6, having adhesive material on both sides, may be introduced between said disk and brace—see Figs. 8 and 9. A diaphragm designed for use in a talking-machine should have a central opening 7.

Figure 6:
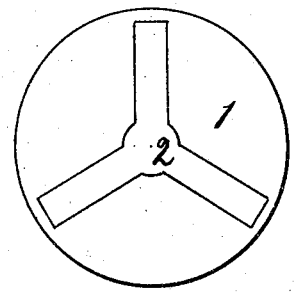
Figure 7:
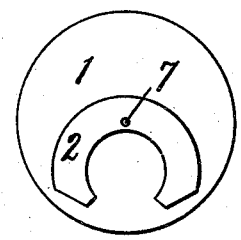

For most purposes the form of brace 2 illustrated in the first two views, which consists of a middle bar with arms extending from the ends thereof in opposite directions, is perhaps most efficient, because it seems to provide just the proper amount of mass or substance at the center of the disk 1, and the required support properly distributed or placed for the peripheral and intermediate portions of said disk. The brace 2 in Fig. 3 differs from the first in that the arms extend in the same direction from the ends of the middle bar. Merely a straight bar is used for the brace 2 in Fig. 4, but this is long enough to afford the necessary support for the peripheral and intermediate portions of the disk 1, besides providing the extra mass at the center. The apex of the angular brace 2 in Fig. 5 augments the center of the disk 1, and the two arms support the other portions of said disk. In Fig. 6 a third arm is present, but this form of brace is liable to be too rigid unless great care be exercised to proportion the parts exactly right. The Fig. 7 brace is quite similar to the Fig. 3 brace, except the former is curved.

From the foregoing description it is clear that I should not be unduly restricted by what I have illustrated in the drawings. The integument is omitted from each of the several plans.

What I claim as my invention, and desire to secure by Letters Patent, is—

1. An acoustic diaphragm comprising a disk having a countersink therein, a brace having a part that is centrally located on said disk, and a part that extends from said first-mentioned part away from the disk center, said brace being set into said countersink, and means to secure said brace rigidly and fixedly to said disk to secure the latter rigidly and fixedly to the former.

2. An acoustic diaphragm comprising a disk having a countersink therein, a brace having a part that is centrally located on said disk, and a part that extends from said first-mentioned part away from the disk center, said brace being set into said countersink, and an integument attached to said disk over said brace.

3. An acoustic diaphragm comprising a disk, and a perforated brace for said disk, said disk having rivet elements punched therefrom and passing through the perforations in said brace to retain the latter in place.

4. An acoustic diaphragm comprising a disk, a perforated brace for said disk, said disk having rivet elements punched therefrom and passing through the perforations in said brace to retain the latter in place, and an integument attached to said disk over said brace to assist said rivet elements in rigidly and fixedly securing said brace to said disk.

5. An acoustic diaphragm comprising a disk, a brace for said disk, means to secure said brace to said disk, and a fabric insert between said disk and brace.

6. An acoustic diaphragm comprising a disk having a countersink therein, a brace for said disk, said brace being set into said countersink, and consisting of a part adapted to be centrally located on said disk, and of arms extending from such part toward the periphery of said disk, and means to secure said brace rigidly and fixedly in place in said disk.

7. An acoustic diaphragm comprising a disk having a countersink therein, a brace for said disk, said brace being set into said countersink, and consisting of a bar adapted to be centrally located on said disk, and of arms extending from the ends of said bar, and means to secure said brace rigidly and fixedly in place in said disk.

8. An acoustic diaphragm comprising a disk having a countersink therein, a brace for said disk, such brace being set into said countersink, and consisting of a bar adapted to be centrally located on said disk, and of arms extending in opposite directions from the ends of said bar, and means to secure said brace rigidly and fixedly in place in said disk.

WILLIAM W. YOUNG.

Witnesses:
F. A. CUTTER,
A. C. FAIRBANKS.

Copies of this patent may be obtained for five cents each, by addressing the "Commissioner of Patents, Washington, D. C."